(12) United States Patent
Fritz et al.

(10) Patent No.: US 7,938,873 B2
(45) Date of Patent: May 10, 2011

(54) DUST SUCTION MODULE FOR HAND-HELD POWER TOOL

(75) Inventors: Gerold Fritz, Vaduz (AT); Rainer Ontl, Landsberg am Lech (DE)

(73) Assignee: Hilti Aktiengesellschaft, Schaan (LI)

( * ) Notice: Subject to any disclaimer, the term of this patent is extended or adjusted under 35 U.S.C. 154(b) by 323 days.

(21) Appl. No.: 12/291,245

(22) Filed: Nov. 7, 2008

(65) Prior Publication Data

US 2009/0133892 A1 May 28, 2009

(30) Foreign Application Priority Data

Nov. 26, 2007 (DE) .................. 10 2007 056 867

(51) Int. Cl.
*B01D 50/00* (2006.01)
(52) U.S. Cl. ............... 55/385.1; 81/57.44; 81/DIG. 12; 173/168; 173/169; 173/170

(58) Field of Classification Search .............. 55/385.1, 55/503, 504, 505; 81/57.44, DIG. 12; 173/168, 173/169, 170; 227/130
See application file for complete search history.

(56) References Cited

U.S. PATENT DOCUMENTS

| | | | | |
|---|---|---|---|---|
| 5,637,125 | A * | 6/1997 | Amada | 55/385.1 |
| 2002/0152731 | A1 * | 10/2002 | Reich et al. | 55/385.1 |
| 2006/0107634 | A1 * | 5/2006 | Ohlendorf | 55/385.1 |
| 2006/0162302 | A1 * | 7/2006 | Terrell | 55/385.1 |

* cited by examiner

*Primary Examiner* — Duane Smith
*Assistant Examiner* — Minh-Chau Pham
(74) *Attorney, Agent, or Firm* — Abelman, Frayne & Schwab

(57) ABSTRACT

A dust suction module includes a plurality of bearing surfaces (2, 2', 2") with which the dust suction module (1) is mountable on an associated hand-held power tool (3), an air filter (4), a rotatable suction wheel (5), a plurality of opening outwardly, air discharge openings (6), and a plurality of opening outwardly, auxiliary discharge openings (7) formed in at least one of the plurality of bearing surfaces (2).

6 Claims, 3 Drawing Sheets

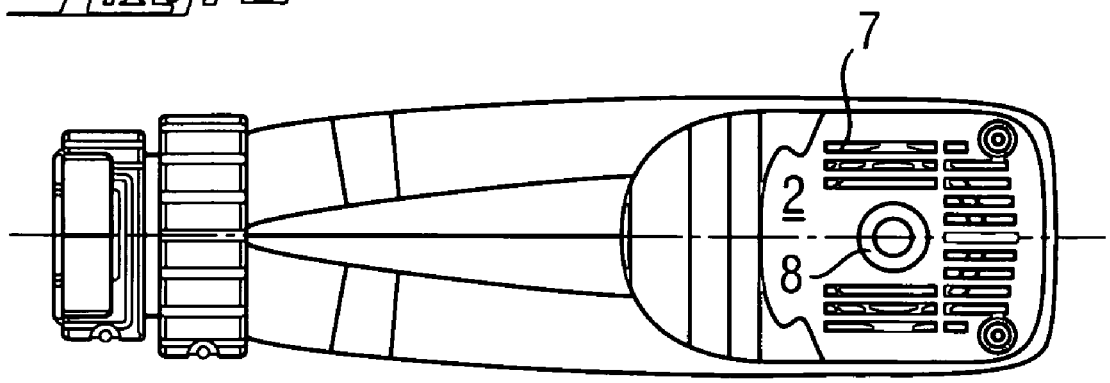
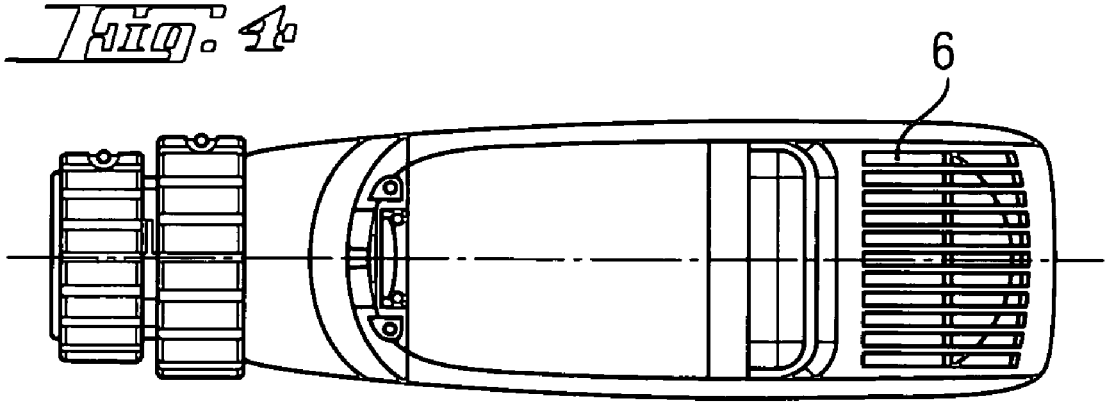

DUST SUCTION MODULE FOR HAND-HELD POWER TOOL

BACKGROUND OF THE INVENTION

1. Field of the Invention

The present invention relates to a dust suction module for a rotary-percussion hand-held power tool such as a hammer drill or a combination hammer.

2. Description of the Prior Art

During drilling and chiseling of stone, concrete and the like, the produced dust in form of drilling dust and/or drillings necessitates finishing works and increases wear of the hand-held power tools.

According to the German Publication DE 10 2004 029 220, in a dust suction module that is combined with a hand-held power tool, an available air flow, which is produced by a fan located in the interior of the power tool, is used for aspirating the produced drilling dust and drillings. To this end, the discharge openings of the module housing are formed only in the bearing surfaces which sealingly abut associated respective surfaces of the power tool housing which, on its part, are provided with suction openings.

A dust suction module according to European Publications EP 470 046 and EP 1 245 330 is formed as a unit connectable with a hand-held power tool, with a suction wheel, which is located inside the module, being connected with a driving shaft of the power tool for joint rotation therewith. Air, which is aspirated, together with the drilling dust, is filtered and is released in the environment through discharge openings located behind the suction wheel and opening only outwardly.

An object of the present invention is to provide a dust suction module with a located, in the interior of module, suction wheel and having an increased suction capacity.

Another object of the present invention is to provide a dust suction module having identical suction characteristics at a predetermined use with hand-held power tools of a power tool system which have different power efficiencies.

SUMMARY OF THE INVENTION

These and other objects of the present invention, which will become apparent hereinafter are achieved by providing a dust suction module having a plurality of bearing surfaces with which the dust suction module is mountable on an associated hand-held power tool, an air filter, a rotatable suction wheel, a plurality of opening outwardly, air discharge openings, and a plurality of opening outwardly, auxiliary discharge openings formed in at least one of the plurality of bearing surfaces.

Through the auxiliary discharge openings in the bearing surfaces and the associated inlet openings of the corresponding surfaces of the power tool housing, a portion of the suction air flow enters the cooling flow of the power tool, which increases the suction capacity.

Advantageously, an entire open surface of the auxiliary openings is smaller than an open surface of the air discharge openings and advantageously, the entire open surface of the auxiliary openings amounts to about two-thirds of the open surface of the air discharge openings. Thereby, about half of the suction air flow of the dust suction module is produced by the inner suction wheel and about half of the suction air flow is produced by the aspirated cooling air flow of the power tool.

Advantageously, the suction wheel is formed as a (aspirating radially inwardly) radial suction wheel. Thereby, a constructively simple pressurized air discharge radially outwardly, on both axial sides, become possible.

Advantageously, the auxiliary openings are formed in the bearing surface through which the drive shaft of the suction wheel extends, whereby the auxiliary openings can be formed constructively simply on the pressure side of the suction wheel.

Advantageously, the auxiliary openings, which are formed in the at least one of the bearing surfaces, are enclosed, in a bathtub-shaped manner, from three sides by other bearing surfaces. Thereby, the power tool housing surfaces, which are received in the bathtub profile and which are provided, in their bottom and adjacent to the bottom with inlet openings, are sealingly enclosed by the bath-tub profile.

A dust suction module according to the present invention can be advantageously used in a power tool system to provide, with a corresponding connection with different associated hand-held power tools having different rotational speeds of respective motors, approximately the same suction capacity. With first power tools with a relatively slow rotatable motor (and thereby the suction wheel) (as described above), the discharge air of the suction air flow is blown in the free space by both the suction wheel and also directly aspirated through air inlet opening of the power tool as a cooling air flow. Thereby, the suction wheel can be eliminated. With associated second power tools with a relatively rapidly rotatable motor (and thereby the suction wheel), the air inlet openings are closed. Thereby, the discharge air of the suction air flow must be aspirated in the free space (blown in) entirely by the suction wheel. As a result, with a reduced total opening surface, because only air discharge openings are available, the increase of the to-be feeding pressure difference does not lead to the rise of the suction air flow despite the high rotational speed of the motor (and thereby, of the rotational speed of the suction wheel). Thus, the suction capacity of the dust suction module is available to the user in equal measure at an alternative respective connection with one of the two power tools.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

The drawings show:

FIG. 3 a plan view of the dust suction module shown in FIG. 1; and

FIG. 4 a bottom view of the dust suction module shown in FIG. 1.

DETAILED DESCRIPTION OF THE PREFERRED EMBODIMENT

Figure 1:
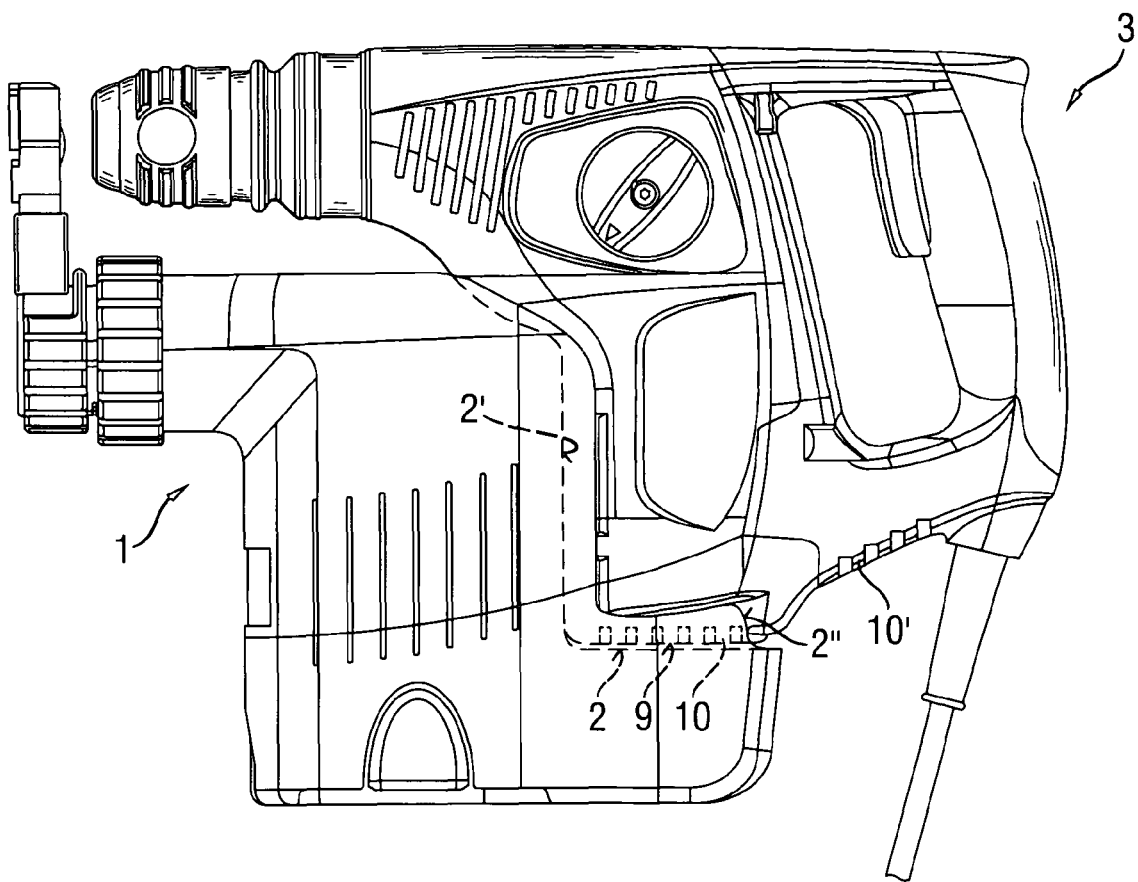
FIG. 1 a side view of a dust suction module according to the present invention, together with an associated hand-held power tool.

A dust suction module 1 according to the present invention, which is shown in FIG. 1, is combined with an associated hand-held power tool 3, with the bearing surfaces 2, 2', 2" adjoining the power tool housing surfaces 9 that are provided in their bottom and in the vicinity of the bottom with inlet openings 10, 10', respectively.

Figure 2:
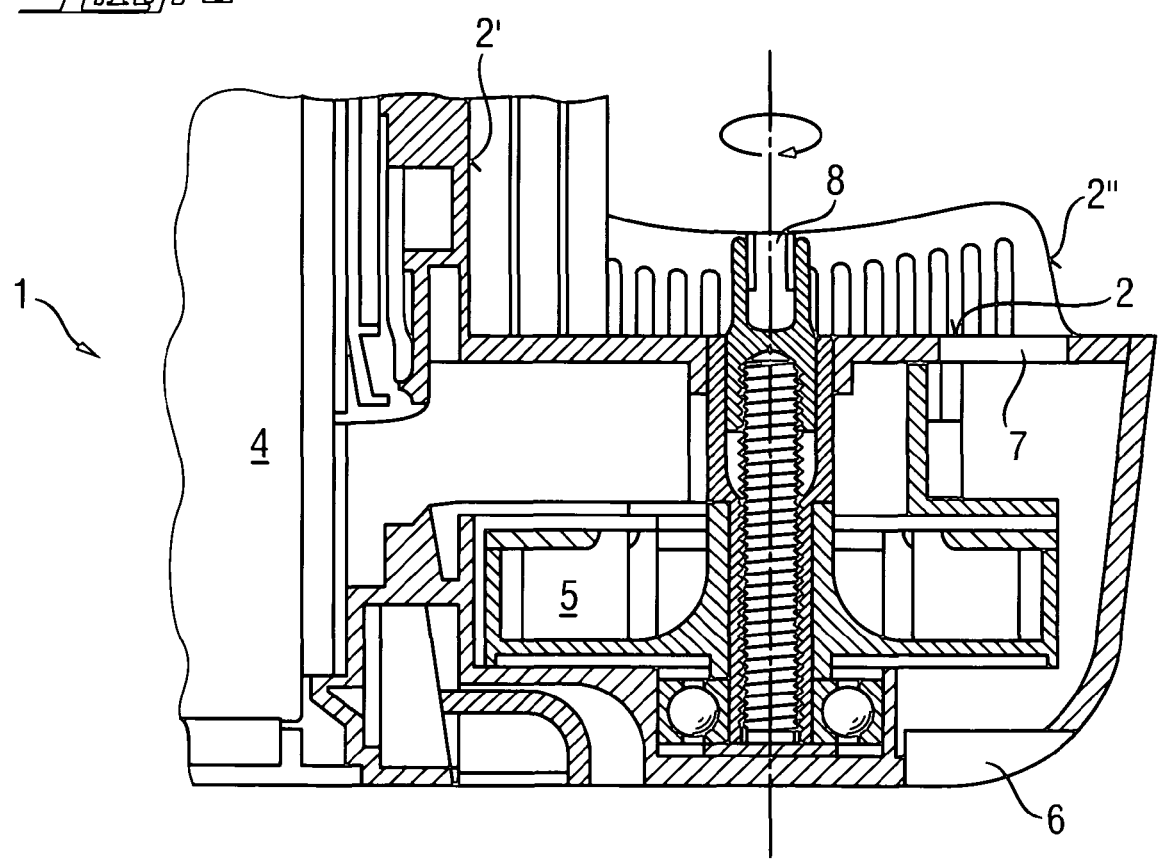
FIG. 2 a cross-sectional view of the dust suction module shown in FIG. 1, at an increased, in comparison with FIG. 1, scale.

As shown in FIG. 2, the dust suction module 1 has an air filter 4, a rotatable, inwardly located, suction wheel 5 in form of a radial suction wheel, and air discharge openings 6 that open outwardly. Additionally, auxiliary, opening outwardly, openings 7 are formed in the bearing surface 2. The auxiliary openings 7 are formed, as indicated above, in the bearing surface 2 through which a drive shaft 8 of the suction wheel extends. The auxiliary openings 7 are enclosed from three sides, in a bathtub-shaped manner, by the bearing surfaces 2', 2".

Thereby, the housing surfaces 9 (FIG. 1) of the hand-held power tool 3 which are inserted in the bathtub-shaped cavity formed by the bearing surfaces 2, 2', 2" and the inlet openings 10 (FIG. 1) of which are associated with the auxiliary openings 7, are sealingly enclosed by the bearing surfaces 2, 2', 2" of the dust suction module 1. The inlet openings 10', which are located in the vicinity of the bottom of the housing surfaces 9, remain free.

The entire open surface of the auxiliary openings 7, which can be seen in FIG. 3 and which is provided in the bearing surface 2, constitutes two/third of the entire open surface of the air discharge openings 6 which is shown in FIG. 4.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A dust suction module for being mounted on an associated hand-held power tool (3) a housing of which has a housing surface (9) provided with a plurality of inlet openings (10), the dust suction module comprising a plurality of bearing surfaces (2, 2', 2") adjoining the housing surface (9) in a mounted condition of the dust suction module (1) on the power tool (3); a rotatable suction wheel (5) for aspirating air; an air filter (4) for filtering the aspirated air; a plurality of discharge openings (6) that open outwardly; and a plurality of auxiliary discharge openings (7) formed in at least one of the plurality of bearing surfaces (2, 2', 2") and which also open outwardly.

2. A hand-held power tool according to claim 1, wherein the clamping flange (3) is formed of steel.

3. A dust suction module according to claim 1, wherein the suction wheel (5) is formed as a radial suction wheel.

4. A dust suction module according to claim 1, wherein a drive shaft (8) for driving the suction wheel extends through the at least one of bearing surfaces (2).

5. A dust suction device according to claim 4, wherein the auxiliary openings (7), which are formed in the at least one of the bearing surfaces (2) are enclosed, in a bathtub-shaped manner, from three sides by other bearing surfaces (2', 2").

6. A dust suction device according to claim 1, wherein the auxiliary openings (7) are associated with least some of the air inlet openings (10) of the associated hand-held power tool (3).

* * * * *